Patented Jan. 15, 1946

2,392,910

UNITED STATES PATENT OFFICE 2,392,910

CHEMICAL PROCESS

Raymond A. Franz, Wallingford, Pa., assignor to The United Gas Improvement Company, a corporation of Pennsylvania No Drawing. Application June 17, 1941, Serial No. 398,404

7 Claims. (Cl. 260—668)

This invention pertains generally to the purification of hydrocarbons and pertains particularly to the purification of unsaturated hydrocarbons obtained from (1) gas condensates and tar oils produced in the manufacture of artificial gas; (2) cracked petroleum products; (3) coal tar distillates; and (4) synthetic sources such as processes for the manufacture of synthetic styrene.

The object of my invention is to provide a new method for the purification of unsaturated hydrocarbons and solutions and/or mixtures thereof by successive treatments with mercury salts followed by treatment with a salt of a metal of Group 1, family 2 of the periodic table, such as cuprous salts or silver salts. By unsaturated hydrocarbons is meant olefine and diolefine hydrocarbons. These two classes may be further subdivided into aliphatic, cyclic, and aromatic types.

In the various processes for the manufacture of artificial gas such as oil gas, carburetted water gas or coal gas, considerable quantities of tar are produced, and the gas contains substantial quantities of readily condensible materials.

These condensates, as well as the light oil obtained upon distillation of the tar, are sources for many hydrocarbons such as benzene, toluene, xylene, ethylbenzene, naphthalene, anthracene, indene, styrene, methylstyrene, cyclopentadiene, cyclohexane, cyclohexadiene, heptenes, isobutylene, isoprene, piperylene, butadiene, and the like.

With ordinary methods of fractional distillation as now practiced, it is impossible to separate many of the unsaturated compounds in a substantially pure state because of the presence of other materials which apparently are either of similar boiling point or are capable of forming azeotropic mixtures with the desired hydrocarbon.

For example, a typical styrene fraction obtained by ordinary distillation processes will contain hardly more than 50% or 60% styrene and a typical indene fraction will contain hardly more than 80% indene.

Such fractions as well as those of lower or higher concentrations are generally suitable for the manufacture of synthetic resins by polymerization except that the resulting resins are very often too inferior with respect to color, color stability, electrical resistance, molding properties, freedom from crazing or blushing, thermal stability, melting point, viscosity, molecular weight, and mechanical strength as to be of any considerable value.

I find that these deficiencies are generally traceable to the presence during polymerization of certain contaminating materials. Although I have not determined the chemical constitution of all of these impurities, experimental evidence indicates that they may be classified in certain specific groups.

For example, typical styrene fractions obtained from light oil were analyzed and found to contain up to 3% phenylacetylene.

Another portion of a typical styrene fraction was analyzed and found to contain 0.1% sulfur. This indicates that the impurities which contain sulfur may be there in the form of sulfides, mercaptans, thiophenes, and similar compounds.

Another portion was found to produce a silver mirror when treated with ammoniacal silver nitrate, thus indicating the presence of reducing compounds such as aldehydes formed during the production of the styrene fraction.

Other types of impurities also are present, although specific tests have not as yet been devised for their detection. Among these types of impurities may be included oxygenated compounds, organic peroxides, oxides, organic acids, peracids, esters, ketones, amines, nitriles and other reactive classes of compounds.

As indicated above, it is difficult if not impossible to prepare a commercial grade of resin, such as polystyrene, from crude light oil fractions unless at least some of the contaminating impurities are removed.

While the exact influence of these contaminating materials is not known it may be pointed out that they may act (1) as accelerators, resulting in the production of polystyrene of relatively poor quality under the polymerizing conditions which would normally result in the production of a good grade of polystyrene; (2) as inhibitors, reducing the quantity of polystyrene obtained under normal polymerizing conditions; and/or (3) they may take part in the reaction and become an integral part of the resin molecule.

The presence of contaminating impurities in the polymer molecule would undoubtedly weaken it, causing the resin to be less stable to heat and to readily decompose with the formation of color bodies.

The highly reactive nature of the desired hydrocarbons makes it extremely difficult to remove the contaminating impurities by ordinary methods of purification. Such methods as are common practice in the petroleum or coal tar refining industries would remove most, if not all, of the styrene present.

It seems probable that any material which is sufficiently reactive to be capable of use for the purification of the desired crude hydrocarbons will also react with them.

I have found that the treatment of impure styrene fractions in general, and light oil styrene fractions in particular, with a mercurating solution such as an aqueous mercuric chloride solution or suspension buffered with acetate, followed by treatment with a solution or suspension of a salt of a metal of Group 1, family 2 of the periodic system, such as an aqueous cuprous chloride suspension, there is obtained a refined styrene fraction possessing unusually desirable properties.

The foregoing order of applying the indicated reactants may be reversed, if desired, although I have found that somewhat inferior results are obtained by so doing in certain cases.

The results obtained by successive treatments of the type described are very much superior to the results obtained by treatment with either of the reagents alone.

The primary purpose of my invention is to reduce the naturally occurring impurities of an unsaturated hydrocarbon fraction such as styrene to such a degree that they no longer interfere with the production of a resin of good quality. The amount of impurities can be reduced by any desired amount depending wholly upon the conditions employed.

Another purpose of my invention is to increase the yield of polymer from an unsaturated hydrocarbon fraction by successive treatments with mercury salts and cuprous or silver salts. I have found that the yield of resin can be largely increased by first removing the undesirable materials with successive treatments of the type described.

Still another purpose of my invention is to reduce the quantity of undesirable color and color-forming compounds present in crude unsaturated hydrocarbons by successive treatments with mercury salts and cuprous or silver salts.

Still another purpose of my invention is to improve the odor of crude unsaturated hydrocarbons by successive treatments with mercury salts and cuprous or silver salts.

While solutions of any desired strength may be employed, I have found that approximately a 10% aqueous solution of the mercuric salt is very satisfactory. This solution may be used as such or in conjunction with certain buffers, for example, sodium acetate.

Although the ratio of the amounts of mercury salts to the amount of the crude unsaturated hydrocarbon may be widely varied depending upon the quantities of impurities present, I have found that from 2% to 10% gives satisfactory results.

For small batches it is convenient to bring about contact between the aqueous and hydrocarbon phases by merely shaking or stirring the mixture thoroughly. For larger amounts, however, the principle of counter-current flow may be used for the removal of the impurities from the unsaturated hydrocarbon, if desired.

Any suitable temperature may be employed for the treatment, temperature in the range of 20° C. to 50° C. being particularly satisfactory.

The time required for the reaction to come to completion will vary with the nature and quantity of the impurity present in the given unsaturated hydrocarbon fraction. I prefer to react the two phases from 15 minutes to 5 hours.

When using cuprous salts I have found it desirable to use some reducing agent such as copper powder to prevent the oxidation of the cuprous salts. Although any cuprous salt may be used I prefer to use cuprous chloride.

The amounts of cuprous chloride to be used in the purification of unsaturated hydrocarbons will depend upon the quantities of impurities present. I have found that from 2 to 20% by weight of the cuprous chloride or similar salt, based on the weight of the fraction to be treated, to be quite satisfactory.

It is also advantageous to apply the silver salt such as the nitrate or cuprous salt such as the chloride in the form of an ammoniacal solution.

The method may be more particularly described by means of the following examples.

*Example #1*

The crude light oil, styrene fraction used in this experiment had the following physical properties:

Density (d 20/4) =0.8864
Refractive index (n 20/D) =1.5220
Styrene concentration=50.5%
Phenylacetylene concentration=0.38%
Color=5.8 (Gardner scale)

Upon heating a sample of this freshly distilled material in a sealed glass bomb in an atmosphere of nitrogen for 10 days @ 100° C. the polystyrene obtained after the removal of the unpolymerized materials present had the following properties.

Yield=33.0%
Viscosity (in 10% toluene solution @ 25° C.) = 10.8 centipoises
Mold color=4.3 Gardner color scale
Melting point=175° C.

The resin was yellow in color, brittle, and possessed other undesirable properties.

*Example #2*

A mercurating solution was prepared by dispersing
10 grams of mercuric chloride and
20 grams of sodium acetate in
100 grams of water.

To this solution there was added 232 grams of the same crude styrene fraction used in Example #1. After shaking for two hours, the precipitate, amounting to 3.8 grams, was separated by filtration.

The styrene solution then was dried and distilled. The color of the refined solution at this stage was 1.0 on the Gardner color scale. A sample of this refined fraction then was polymerized according to the method as described in Example #1. The physical properties of the poly-styrene obtained were as follows:

Yield=38.3%
Viscosity (in 10% toluene solution @ 25° C.) =16.9 centipoises
Mold color=4.1 Gardner color scale
Melting point=185° C.

*Example #3*

A cuprous chloride suspension was prepared by agitating a mixture of 10 grams of cuprous chloride,
4 grams of copper powder,
7.7 grams of a 28% ammonium hydroxide solution, and 3.8 grams of water.

To the above mixture there was added 100 cc. of the same crude styrene fraction used in Example #1. The mixture was shaken for two hours, filtered, dried, and distilled. The distillate had a color of 5.2 on the Gardner color scale. A polymer prepared from this refined fraction by this method described in Example #1 had the following physical constants:

Yield = 39.0%
Viscosity (in 10% toluene solution @ 25° C.) = 16.2 centipoises
Mold color = 4.7 Gardner color scale
Melting point = 177° C.

Example #4

A portion of the same styrene fraction used in Example #1 was treated with the cuprous chloride suspension described in Example #3, after which the layers were separated and the hydrocarbon fraction treated with the mercurating solution described in Example #2. The styrene fraction was then dried and distilled. It had a color of 2.4 on the Gardner color scale. A sample of the refined fraction was polymerized as described in Example #1, the resin obtained having the following physical properties:

Yield = 41.5%
Viscosity (in 10% toluene solution @ 25° C.) = 22.6 centipoises
Mold color = 4.0 Gardner color scale
Melting point = 186° C.

Example #5

A portion of the same styrene fraction used in Example #1 was treated with the mercurating solution described in Example #2, after which the layers were separated and the hydrocarbon fraction treated with the cuprous chloride mixture as described under Example #3. The fraction was then dried and distilled. It had a color of 0.5 on the Gardner color scale which was considerably lighter than the purified styrene samples obtained previously. When polymerized as described in Example #1, the resin had the following physical constants.

Yield = 38.7%
Viscosity (in 10% toluene solution @ 25° C.) = 24.8 centipoises
Mold color = 1.9 Gardner color scale
Melting point = 186.° C.

It will be noted that the viscosity and hence the molecular weight and mechanical strength of the polystyrene obtained by the treatment of the light oil styrene fraction with successive treatments with a mercurating solution and a cuprous chloride solution, particularly in the order given, was considerably higher than the corresponding viscosities of the polystyrene samples obtained by treating the same light oil sample with either of the solutions alone. The improvement in the viscosity of the polystyrene obtained by the preferred treating method over that of the polystyrene obtained from the untreated sample is quite marked.

Styrene fractions containing from 1% to 99.9% monomeric styrene may be treated by the method described herein to produce water-white refined fractions possessing only traces, or none, of undesired impurities, such as phenylacetylene, color, and color-forming bodies. Fractions containing at least 30% styrene are preferred, particularly when the monomer is to be converted into polystyrene. For this purpose a styrene fraction of at least 50% is particularly preferred. While the boiling range of extremely dilute styrene fractions may cover a fairly wide range, boiling ranges between approximately 125° to 165° C. and more especially between approximately 135° and 155° C. are preferred. Narrower fractions such as between approximately 140 and 150° C. are particularly desirable. Extremely dilute fractions may be employed in some instances such as when it is desired to react styrene with some other compound in which case my treatment serves to purify such styrene for reaction purposes.

While reagents and procedures of a particular nature have been specifically described, it is to be understood that these are by way of illustration only. Therefore, changes, omissions, additions, substitutions, and/or modifications may be made within the scope of the claims without departing from the spirit of the invention which is intended only to be limited as required by the prior art.

I claim:

1. A process for refining styrene admixed with impurities including phenyl acetylene and at least one organic color-imparting material normally present in a light oil styrene fraction comprising contacting said mixture with a solution containing a mercury salt to react at least a portion of said organic color imparting material, recovering styrene in less contaminated form from the reaction mass, contacting the mixture of styrene and remaining impurity with a solution of cuprous chloride to react at least a portion of said phenyl acetylene, and recovering styrene from the resulting reaction mass at least partially purified from said phenyl acetylene and from said organic color imparting material.

2. A process for refining a light oil styrene fraction containing at least 30% styrene from contaminating material including phenyl acetylene and organic color-imparting material comprising contacting said fraction with a solution containing a quantity of a mercury salt equal to from 2 to 10% of the weight of said fraction to react said organic color-imparting material, separating said styrene fraction from the reaction mass with reduced content of organic color-imparting material, thereafter contacting said fraction with a solution containing a quantity of a cuprous salt equal to from 2 to 20% of the weight of said fraction to react said phenyl acetylene and thereafter recovering said light oil fraction from the reaction mass in a form in which the styrene content thereof has been purified from phenyl acetylene as well as from organic color-imparting material.

3. A process for refining a light oil fraction of one of a group consisting of styrene, methyl styrene and indene, said fraction being contaminated with naturally occurring impurities including acetylenic material and organic color-imparting material, comprising commingling said fraction with a mercury salt to react a portion of said impurities, thereafter commingling said fraction with one of a group consisting of cuprous salts and silver salts to react another portion of said impurities, and separating said reagents including reaction products thereof from said light oil fraction to recover said light oil fraction less contaminated with impurities.

4. A process for refining a light oil fraction of one of a group consisting of styrene, methyl styrene and indene, said fraction being contaminated with naturally occurring impurities including acetylenic material and organic color-imparting material, comprising commingling said fraction with mercuric chloride in aqueous medium to react a portion of said impurities, thereafter commingling said fraction with cuprous chloride in aqueous medium to react another portion of said impurities, and separating said reagents including reaction products thereof from said light oil fraction to recover said light oil fraction less contaminated with impurities.

5. A process for refining a light oil fraction of one of a group consisting of styrene, methyl styrene and indene, said fraction being contaminated with naturally occurring impurities including acetylenic material and organic-color-imparting material, comprising commingling said fraction with mercuric chloride in aqueous medium to react a portion of said impurities, thereafter commingling said fraction with silver nitrate in aqueous medium to react another portion of said impurities, and separating said reagents including reaction products thereof from said light oil fraction to recover said light oil fraction less contaminated with impurities.

6. A process for refining a light oil fraction of one of a group consisting of styrene, methyl styrene and indene, said fraction being contaminated with naturally occurring impurities including acetylenic material and organic color-imparting material, comprising commingling said fraction with an aqueous solution of mercuric chloride to react a portion of said impurities, thereafter commingling said fraction with an ammoniacal solution of cuprous chloride to react another portion of said impurities, and separating said reagents including reaction products thereof from said light oil fraction to recover said light oil fraction less contaminated with impurities.

7. A process for refining a light oil fraction of one of a group consisting of styrene, methyl styrene and indene, said fraction being contaminated with naturally occurring impurities including acetylenic material and organic color-imparting material, comprising commingling said fraction with an aqueous solution of mercuric chloride to react a portion of said impurities, thereafter commingling said fraction with an ammoniacal solution of silver nitrate to react another portion of said impurities, and separating said reagents including reaction products thereof from said light oil fraction to recover said light oil fraction less contaminated with impurities.

RAYMOND A. FRANZ.